Dec. 6, 1966 W. E. GLENN, JR 3,289,961

TENSION MAINTAINING DEVICE FOR TAPE RECORDERS

Filed Dec. 3, 1964

Inventor:
William E. Glenn Jr.,
by John P. Dellitt
His Attorney.

United States Patent Office 3,289,961
Patented Dec. 6, 1966

3,289,961

TENSION MAINTAINING DEVICE FOR TAPE RECORDERS

William E. Glenn, Jr., Scotia, N.Y., assignor to General Electric Company, a corporation of New York
Filed Dec. 3, 1964, Ser. No. 415,709
8 Claims. (Cl. 242—55.12)

Figures 1, 2, 3:
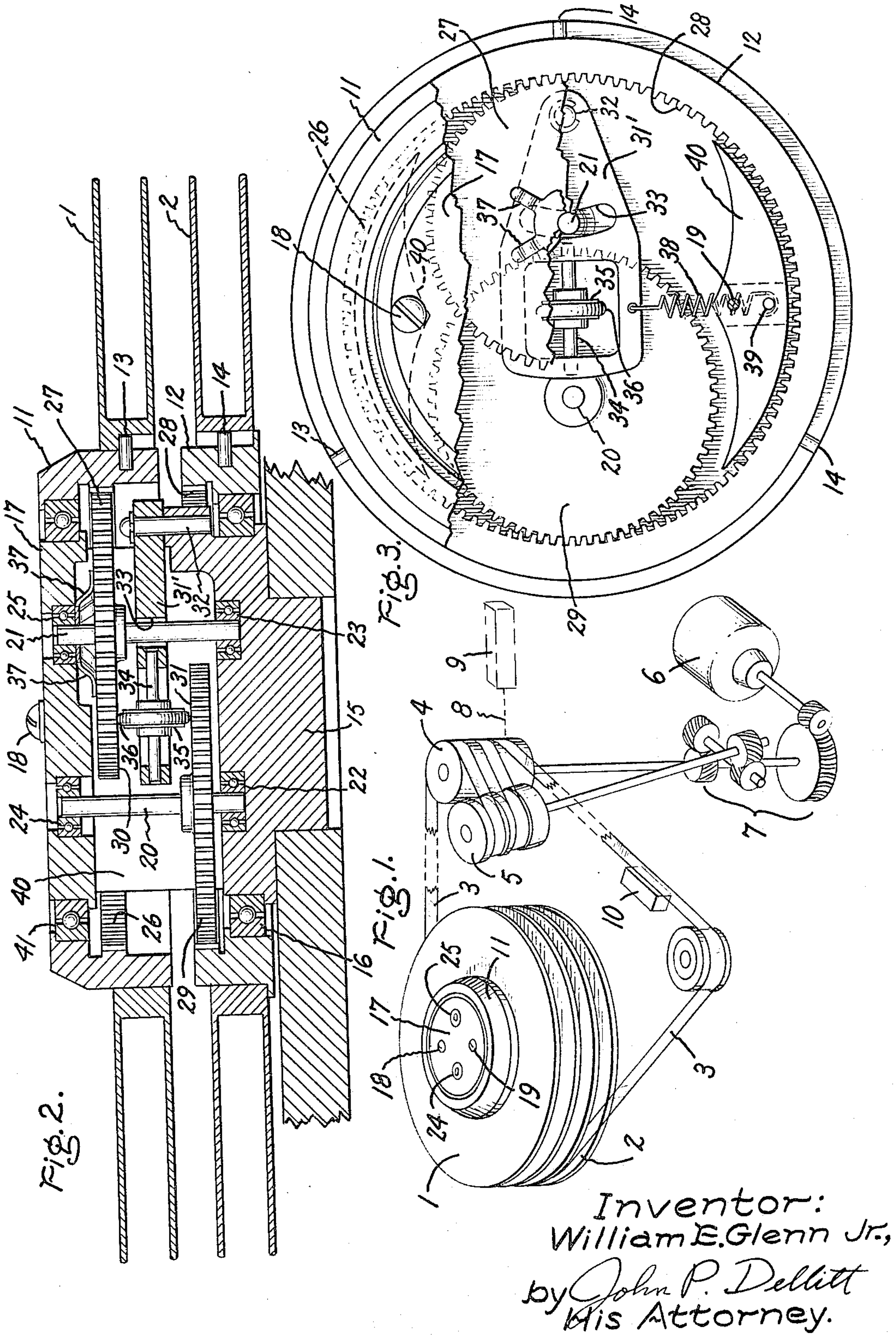

This invention relates to a tape transport apparatus and particularly to such apparatus for maintaining tape tension and accommodating tape storage in a minimum space.

In conventional tape transport apparatus for use in recording devices and the like, one tape storage reel is usually positioned on one side of a recording head while the remaining reel is located on the opposite side in substantially the same plane as the first. Thus the conventional recorder requires overall lateral dimensions sufficient to accommodate at least these three items. If two tape reels could be accommodated one above the other, the space requirements are materially reduced. The problem is complicated, however, by the tension maintaining requirement upon the tape reels. As one reel passes out tape towards the recording head, the remaining tape reel must take up the recorded tape while a tension is maintained on the reels and tape so it does not become slack. It is an object of this invention to provide improved tape transporting apparatus for reeling a length of material, e.g. tape, from one reel to an *adjacent* reel wherein reel tensioning is accomplished without extensive space requirements.

In accordance with a preferred embodiment of the present invention, a pair of adjacent, coaxially disposed tape reel hubs cooperate with an inter-driving arrangement located directly therebetween which mechanism is accommodated within and between the hubs themselves. Each of the hubs is provided with, or forms, a ring gear whose teeth engage a disc having a diameter less than that of the hub. The discs overlap one another and have facing portions in parallel planes, between which an idler wheel engages both discs. The idler wheel is of small diameter and slides along a moveable idler wheel shaft ordinarily extending in the direction of a line between the axes of the two discs. However, this idler wheel shaft can also move out of alignment between these axes. Biasing means and tape tension urge the idler wheel shaft out of alignment with the disc axes so that there is a tendency for the idler wheel to move along the shaft in accordance with the relative speed of the two reel hubs. As one reel pays out tape and the other takes up the same tape, the idler wheel moves along the shaft to maintain the proper tension between the reel hubs even though they are turning at differing and continuously changing speeds.

The subject matter which I regard as my invention is particularly pointed out and distinctly claimed in the concluding portion of this specification. The invention, however, both as to organization and method of operation, together with further objects and advantages thereof, may best be understood by reference to the following description taken in connection with the accompanying drawings in which:

FIG. 1 is a perspective view of tape transport apparatus in accordance with the present invention, FIG. 2 is a cross-sectional side view of tape transport apparatus according to the present invention, and FIG. 3 is a partially broken away plan view of such apparatus wherein the top tape reel hub has been removed.

FIG. 1 is an overall view of a tape transport apparatus including tape reels 1 and 2 carrying a recording tape 3 to and from drive capstans 4 and 5. The tape reels 1 and 2 are juxtaposed next to one another and are preferably coaxial. Drive capstans 4 and 5 frictionally engage the back side of tape 3 and are in turn drive from drive motor 6 via a gear train 7. The drive capstans are inclined with respect to one another, so tape 3 may pass around both capstans a plurality of times without lapping over whereby the drive mechanism has the effect of elevating the tape from the level of reel 2 to the level of reel 1. This drive mechanism drives the tape 3 only upon the back side thereof and is therefore particularly advantageous in the transport of thermoplastic recording tape including intelligence recorded on one side thereof by an electron beam 8 directed towards tape 3 from an electron beam source shown schematically at 9. The electron beam is effective to produce ripples in the thermoplastic tape as the tape is heated by heater mechanism 10. The drive mechanism, engaging only the back side of the tape, will not mar the recorded ripples. A method and apparatus for recording on thermoplastic tape is described and claimed in my Patent No. 3,113,179.

Drive mechanism of the foregoing type employing inclined capstans is described and claimed in my copending application, Serial No. 149,467, entitled "Tape Transport Apparatus," filed November 1, 1961, and assigned to the assignee of the present invention. As described in that application, a tensioning mechanism employing differential gearing driven by a torque motor holds the tension between reels 1 and 2 while the tape is being driven. In accordance with the present invention, a considerably more compact tensioning mechanism is disposed directly between and coaxial with the two tape reels.

Referring to FIGS. 2 and 3 wherein like reference numbers refer to like elements, tape reel 1 rotates with and is supported by reel hub 11 disposed immediately above and coaxial with hub 12 for rotatably supporting reel 2. Pins 13 and 14 key the reels to the respective hubs. Hub 12 turns around support base 15 upon bearings 16 while hub 11 turns upon bearings 41. Top support base 17 is supported upon base 15 with bolts 18 and 19 secured to spacer member 40 extending into base 15. A pair of disc shafts 20 and 21, having axes parallel with the hub axes, also extend between support base 15 and base 17 where they are journaled in bearings 22, 23, 24 and 25. Hub 11 is hollow inside and includes a ring gear 26 having internally directed teeth engaging a flat toothed disc 27 turning upon disc shaft 21. Hub 12 is also provided with internally directed ring gear teeth 28 engaging flat toothed disc 29 rotating upon shaft 20.

Each of the toothed discs 27 and 29 are smaller in diameter than ring gears 26 and 28 but overlap one another whereby flat parallel surfaces thereof, 30 and 31, face one another. The disc shafts 20 and 21 are positioned one on either side of a central axis around which reel hubs 11 and 12 turn and are desirably equi-spaced between such axis and ring gears 26 and 28 on a common diameter of hubs 11 and 12.

Between the opposite faces 30 and 31 of discs 27 and 29 a flat frame 31′ is supported upon a "90 degree" shaft 32 secured in base 15. Shaft 32 is parallel to the axes of the hub and of shafts 20 and 21 but is closer to the ring gears 26 and 28 than are shafts 20 and 21. It is also desirably aligned on the same diameter of hubs 11 and 12 as are shafts 20 and 21. Frame 31′ extends from shaft 32 past shaft 21 and nearly to shaft 20 and is provided with a slot 33 for free passage of shaft 21 therethrough. Frame 31′ carries idler shaft 34, normally disposed along a hub diameter between disc shafts 20 and 21 in a plane parallel to faces 30 and 31, this plane being halfway between those faces. Shaft 34 carries a slidable idler wheel 35 having an outer periphery 36, which may be steel, for frictionally engaging faces 30 and 31 of toothed discs 27 and 29. Idler wheel 35 therefore normally turns in a plane perpendicular to faces 30 and 31, which plane is also perpendicular to radii of the discs 27 and 29. As idler wheel 35 frictionally engages these discs it imparts rotary motion from one disc to the other. Spring clips 37 urge toothed disc 27 from top base 17 along shaft 21 toward the periphery 36 of idler wheel 35 in order for idler wheel 35 to maintain engagement with both toothed discs.

In addition to imparting rotary motion between the two discs, it is also seen that shaft 34 is free to turn around shaft 32 which is disposed at 90 degrees to shaft 34. Shaft 34 is urged away from its position of alignment between axes 20 and 21 by spring biasing means 38 attached between frame 31 and a post 39. Shaft 34 is urged in the opposite direction by tape tension. Thus both discs, turning in the same direction, tend to pull the idler wheel 35 away from alignment between axes 19 and 20, in a direction away from spring 38, when the tape is too tight. The tape should be threaded on the reels such that tension on both reels always tends to pull shaft 34 against the spring tension.

In operation, tape 3 is driven around capstans 4 and 5 off reel 2 and onto reel 1, or vice versa. The action in pulling tape 3 from reel 2 turns wheel hub 12 and also disc 29 which it engages. As disc 29 rotates, idler wheel 35 also turns and drives disc 27 whereby reel 1 is also rotated in the same direction for taking up tape 3. If an equal amount of tape is wound upon each reel, idler wheel 35 will seek a position substantially halfway along shaft 34 whereby discs 27 and 29 turn at equal speed. On the other hand, should less tape be wound upon reel 2, for example, so that disc 29 must turn faster than disc 27, idler wheel 35 will seek a position to the left of the center of shaft 34. Similarly if the idler wheel 35 is located at any inappropriate point along shaft 34 it will be forced into a position such that the correct speed ratio is continuously maintained between the reels. Tape tension pulling the idler wheel against the tension of spring 38, away from between the disc axes, causes the idler wheel to "walk" along its shaft in a first direction between the discs, a component of rotational motion of the discs urging the idler wheel in such direction. If, on the other hand, the tape tends to become slack, idler wheel 35 will move toward spring 38 and will "walk" in the opposite direction along its shaft, always maintaining the correct ratio of tape speed. The mechanism operates for either direction of tape travel. It tends to produce constant tape tension rather than constant torque as in some prior devices, and moreover does so passively without a torque motor. Since no motor is involved, the mechanism may be housed within a vacuum enclosure without vacuum feedthrough for motor shafts. This is a particular advantage for thermoplastic recording wherein a vacuum recording chamber is frequently desirable.

It is understood that the transport device according to the present invention is not restricted to the transport of thermoplastic tape or even a tape or web of a material although it is especially suitable for such material in enabling storage thereof on two adjacent levels. The same apparatus is also useful in maintaining the tension on any length of material which may, for example, take the form of a wire or a strand. Also idler wheel shaft 34 need not be mounted on "90 degree" shaft 32, but may be mounted otherwise so shaft 34 can execute spring loaded movement away from alignment between disc axes as tape tension changes.

In accordance with the present invention, a correct ratio of pay out and take up is continuously maintained on a pair of reels although these reels, in the course of their operation, operate at continuously variable speeds relative to one another. The apparatus in accordance with the present invention accomplishes this result in a very compact area substantially within and between two adjacent reel hubs, therefore facilitating tape storage and handling, reducing the operating mechanism to a very small space.

While I have shown and described several embodiments of my invention, it will be apparent to those skilled in the art that other changes and modifications may be made without departing from my invention in its broader aspects; and I therefore intend the appended claims to cover all such changes and modifications as fall within the true spirit and scope of my invention.

What I claim as new and desire to secure by Letters Patent of the United States is:

1. In a tape transporting apparatus for reeling a length of material, first and second adjacent rotatable hub means for carrying first and second reels rotatable on substantially the same axis, first and second rotatable discs located between said hub means having parallel facing portions between the axes thereof, the axes of said discs being parallel to the axes of said hub means and located within said hub means, each of said hub means internally engaging the periphery of one of said discs in driving relation thereto, and an idler wheel rotatable on an axis perpendicular to the axis of said discs frictionally engaging both of said discs where said discs face one another.

2. In an apparatus for transporting an extended length of material, a first flat disc, a second flat disc parallel to the said first disc with a portion of a face thereof directly opposite and parallel the face of the other disc between the axes of said discs, an idler wheel frictionally engaging the faces of said discs where said discs faces are opposite one another, a shift extending substantially between the axes of said discs in a plane substantially perpendicular to the axes of said discs, said idler wheel being slidable along said shaft, biasing means urging said shaft away from its position between axes of said discs, and first and second adjacent reel carrying means, the first having a driven connection with one of said discs and the second having a driven connection with the other of said discs, said reel carrying means substanially surrounding said discs.

3. A tape transport apparatus comprising first and second substantially coaxial ring gears spaced from one another along substantially the same axis for the purpose of carrying first and second tape reels, a first toothed disc engaging a first of said gears and having an axis parallel to the axis of said ring gears, a second toothed disc engaging the second of said ring gears and having an axis parallel to the axis of said ring gears, said toothed discs lying in substantially parallel planes and overlapping one another in the area between the axes thereof, a shaft perpendicular to the axes of said toothed discs, said shaft extending substantially between the axes of said toothed discs, and an idler wheel having a periphery frictionally engaging the surfaces of said discs and slidable upon said shaft.

4. A tape transport apparatus comprising first and second substantially coaxial ring gears spaced from one another along substantially the same axis for carrying first and second tape reels, a first toothed disc engaging a first of said gears and having an axis parallel to the axis of said ring gears, a second toothed disc engaging the second of said ring gears, and having an axis parallel to the axis of said ring gears, said toothed discs lying in substantially parallel planes and overlapping one another in the area between the axes thereof, a shaft perpendicular to the axes of said toothed discs, said shaft extending substantially between the axes of said toothed discs, an idler wheel having a periphery frictionally engaging the surfaces of said two discs and slidable upon said shaft, and means for rotating said shaft about an axis parallel to the axes of said toothed discs, said shaft having a turning radius on said last mentioned axis longer than the distance between the axes of said toothed discs, and biasing means urging said shaft to a position away from said shaft position extending substantially between the axes of said toothed discs.

5. In an apparatus for transporting a length of material, a first rotatable hub for carrying a first reel, a second rotatable hub adjacent the first for carrying a second reel on substantially the same axis as the first, each of said hubs being provided with a ring of gear teeth facing inwardly, a first toothed disc engaging the gear teeth of said first hub, a second toothed disc engaging the teeth of said second hub, said toothed discs having a diameter less than the diameter of the ring of gear teeth on said respective hubs, said toothed discs overlapping one another in parallel adjacent relation, a shaft extending between the axes of said toothed discs, an idler wheel frictionally engaging parallel adjacent faces of said discs and slidable upon said shaft, and biasing means urging said shaft out of alignment between said axes and said discs.

6. In a tape transport apparatus, first and second adjacent tape-carrying reels, one for paying out tape while the other is taking up the same tape, said reels being disposed to rotate about substantially the same axis, first rotating disc means substantially enclosed by said reels and having an axis parallel to the axis of said reels, said first disc means having a driven relationship to the first of said reels, second disc means also substantially enclosed by said reels having an axis parallel to the axis of said reels and having a driven relationship to the second of said reels, each said disc means having an outer radius overlapping the other disc means toward the axis of the other disc means so the disc means are parallel and adjacent one another between the axes thereof, and an idler wheel having an axis substantially perpendicular to the axes of said disc means and extending therebetween, said idler wheel being moveable along its axis, the idler wheel contacting adjacent surfaces of said disc means for imparting motion one to the other so that said disc means and therefore said reels rotate with a speed ratio determined according to the position of said idler wheel along its axis.

7. In an apparatus for transporting a length of material, a first rotatable hub for carrying a first reel, a second rotatable hub adjacent the first for carrying a second reel on substantially the same axis as the first, each of said hubs being provided with a ring of gear teeth facing inwardly, a first toothed disc engaging the gear teeth of said first hub, a first disc shaft upon which said first toothed disc rotates, a second toothed disc engaging the teeth of said second hub, a second disc shaft upon which said second toothed disc rotates, said disc shafts being located inside said hubs and the ring of gear teeth thereof, said toothed discs having a diameter less than the diameter of the ring of gear teeth on said respective hubs, and said toothed discs overlapping one another in parallel adjacent relation, an idler wheel shaft extending substantially between the first and second shafts in a plane substantially perpendicular to said disc shafts and between said discs, an idler wheel frictionally engaging parallel adjacent faces of said discs and slidable on said idler wheel shaft, support means for said idler wheel shaft moveable out of alignment between said disc axes, and biasing means urging said support means out of alignment between said disc shafts against the tension of said length of material.

8. In an apparatus for transporting a length of material, a first rotatable hub for carrying a first reel, a second rotatable hub adjacent the first for carrying a second reel on substantially the same axis as the first, each of said hubs being provided with a ring of gear teeth facing inwardly, a first toothed disc engaging the gear teeth of said first hub, a first disc shaft upon which said first toothed disc rotates, a second toothed disc engaging the teeth of said second hub, a second disc shaft upon which said second toothed disc rotates, said disc shafts being located inside said hubs and the ring of gear teeth thereof, said toothed discs having a diameter less than the diameter of the ring of gear teeth on said respective hubs, said toothed discs overlapping one another in parallel adjacent relation, an idler wheel shaft extending substantially between the first and second shafts in a plane substantially perpendicular to said disc shafts and between said discs, said idler wheel frictionally engaging parallel adjacent faces of said discs and slidable on said idler wheel shaft, a support frame for said idler wheel shaft rotatable on an axis closer to said hubs than either of said disc shafts in substantial alignment with said disc shafts, said support frame having a slot for passage of one of said disc shafts, and biasing means urging said support frame around its axis out of alignment between said disc shafts.

References Cited by the Examiner

UNITED STATES PATENTS 2,914,266 11/1959 Connell ---------- 242—55.14

FRANK J. COHEN, *Primary Examiner.*

LEONARD D. CHRISTIAN, *Examiner.*